(12) United States Patent
Chen et al.

(10) Patent No.: US 8,784,681 B2
(45) Date of Patent: Jul. 22, 2014

(54) SELF-SITUATING STIMULI-RESPONSIVE POLYMER COMPOSITIONS IN SOIL ADDITIVES AND METHODS FOR USE

(75) Inventors: Zhiyun Chen, Jersey City, NJ (US); Jean-Christophe Castaing, Burlington, NJ (US); Marie-Pierre Labeau, Burlington, NJ (US); Gilda Lizarraga, Chesterfield, NJ (US)

(73) Assignee: Rhodia Operations, Aubervilliers (FR)

( * ) Notice: Subject to any disclaimer, the term of this patent is extended or adjusted under 35 U.S.C. 154(b) by 788 days.

(21) Appl. No.: 12/384,067

(22) Filed: Mar. 31, 2009

(65) Prior Publication Data
US 2009/0242833 A1     Oct. 1, 2009

Related U.S. Application Data

(60) Provisional application No. 61/072,511, filed on Mar. 31, 2008.

(51) Int. Cl.
- *C09K 3/00*   (2006.01)
- *C05G 3/04*   (2006.01)
- *C05G 3/00*   (2006.01)
- *C05D 9/02*   (2006.01)

(52) U.S. Cl.
CPC ............... *C05G 3/04* (2013.01); *C05G 3/0047* (2013.01); *C05D 9/02* (2013.01)
USPC ....................................................... 252/194

(58) Field of Classification Search
USPC ....................................................... 252/194
See application file for complete search history.

(56) References Cited

U.S. PATENT DOCUMENTS

| | | | |
|---|---|---|---|
| 4,124,748 A | 11/1978 | Fujimoto et al. | 526/8 |
| 4,320,040 A * | 3/1982 | Fujita et al. | 524/459 |
| 4,559,074 A | 12/1985 | Clarke | 71/24 |
| 4,906,276 A | 3/1990 | Hughes | 71/77 |
| 4,985,061 A | 1/1991 | Hughes | 71/68 |
| 4,985,062 A | 1/1991 | Hughes | 71/77 |
| 5,202,400 A * | 4/1993 | Itoh et al. | 526/240 |
| 5,303,663 A | 4/1994 | Salestrom | 111/200 |
| 5,532,350 A | 7/1996 | Cottrell et al. | 536/76 |
| 5,649,495 A | 7/1997 | Salestrom | 111/132 |
| 5,927,003 A | 7/1999 | Miller et al. | 47/58 |
| 6,060,557 A | 5/2000 | Dahmen et al. | 524/556 |
| 6,107,432 A | 8/2000 | Engelhardt et al. | 527/311 |
| 6,615,539 B1 * | 9/2003 | Obonai et al. | 47/62 N |
| 6,750,262 B1 * | 6/2004 | Hahnle et al. | 521/64 |
| 2002/0042346 A1 | 4/2002 | Hamersky et al. | 504/361 |
| 2002/0095965 A1 | 7/2002 | Arnold et al. | 71/27 |
| 2003/0027787 A1 | 2/2003 | Couture et al. | 514/54 |
| 2003/0051522 A1 * | 3/2003 | Arnold et al. | 71/11 |
| 2003/0097864 A1 | 5/2003 | Montes et al. | 71/417 |
| 2004/0024104 A1 | 2/2004 | Ota et al. | 524/417 |
| 2004/0074271 A1 | 4/2004 | Krysiak et al. | 71/417 |
| 2006/0035557 A1 | 2/2006 | Anderson et al. | 442/417 |
| 2007/0044528 A1 | 3/2007 | Kitchen | 71/28 |
| 2007/0179291 A1 | 8/2007 | Thibodeau et al. | 536/47 |
| 2007/0295670 A1 | 12/2007 | Bassett | 210/734 |
| 2008/0113866 A1 | 5/2008 | Doane et al. | 504/292 |

FOREIGN PATENT DOCUMENTS

| | | | | |
|---|---|---|---|---|
| CA | WO 98/12154 A1 | 3/1998 | | C05G 3/00 |
| JP | WO 2007/116778 A1 | 10/2007 | | C08F 20/06 |
| WO | WO 83/00482 | 2/1983 | | C03K 17/00 |
| WO | WO 98/12154 | 3/1998 | | C05G 3/00 |
| WO | WO 9812154 A1 * | 3/1998 | | |
| WO | WO 98/49252 | 11/1998 | | C09K 17/22 |
| WO | WO 99/03321 | 1/1999 | | A01C 21/00 |
| WO | WO 99/26885 | 6/1999 | | C02F 1/28 |
| WO | WO 9926885 A1 * | 6/1999 | | |
| WO | WO 02/15687 | 2/2002 | | |
| WO | WO 2005/122668 A2 | 12/2005 | | |
| WO | WO 2006/131213 A1 | 12/2006 | | C08F 2/32 |

OTHER PUBLICATIONS

K.H. Tan, Principles of Soil Chemistry, 3rd ed., Marcel Derkker Inc., 1998, Chapter 3, "Soil-Water Energy Concepts".
D.O. Johnson, et al., "Automation of a Falling Head Permeameter for Rapid Determination of Hydraulic Conductivity of Multiple Samples", Soil Sci. Am. J. 69:828-833 (2005).
M. Th. Van Genuchten, "A Closed-form Equation for Predicting the Hydraulic Conductivity of Unsaturated Soils", Soil Sci. Soc. Am. J. 44:892-898 (1980).
Research paper "Soil physical and chemical characteristics of aging golf greens", Roch Gaussoin, Ph.D., et al, GCM, Jan. 2007.
Passauer, et al., "Starch Phosphate Hydrogels. Part II: Rheological Characterization and Water Retention," Starch-Starke, vol. 61, Issue 11, pp. 628-633, No. 11 Nov. 2009, Abstract only.

(Continued)

*Primary Examiner* — Harold Pyon
*Assistant Examiner* — Katie L Hammer (57) ABSTRACT

Disclosed are soil additives comprised of self-situating, stimuli-responsive polymer compositions and methods of their use. In one embodiment, the polymer composition or polymer network comprises permanent cross-links and non-permanent cross-links, wherein the non-permanent cross-links are capable of being removed upon application or exposure to a stimulus, typically located within the soil. In another embodiment, the method of increasing water retention in soils includes applying a soil additive, comprising polymer networks of the present invention admixed with an aqueous solution to form a colloidal dispersion solution or suspension, to a soil surface. The suspension or colloidal dispersion solution facilitates penetration of the polymer composition through the soil surface and into the soil, migrating typically to lower water potential areas and, more typically, along drainage channels located within the soil. After penetration of the soil surface, the polymer network is then exposed to a stimulus, typically present in the soil, whereby the non-permanent cross-links are removed and the polymer composition undergoes a volumetric change. This results in the prevention, arrest or decelerated loss of water from the targeted area, for example the plant root zone, which allows for improved water usage efficiency by plants, grasses, vegetation, etc.

28 Claims, 3 Drawing Sheets

(56) References Cited

OTHER PUBLICATIONS

Passauer, et al., "Synthesis and Properties of Novel Hydrogels from Cross-linked Starch Phosphates," Macromolecular Symposia, Special Issue: New Cellulose Products and Composites, vol. 244, Issue 1, pp. 180-193, Dec. 2006, Abstract only.

Kulicke, et al., "Swelling and Rheological Studies of Some Starch Hydrogels," Starch-Starke, vol. 41, Issue 4, pp. 140-146, 1989, Abstract only.

Chalker-Scott, "Super-absorbent water crystals," MasterGardner, pp. 35-38, Autumn, 2007.

El Sayed, et al., "Studies of the Effects of Salinity and Hydrogel Polymer Treatments on the Growth, Yield Production and Solute Accumulation in Cotton and Maize," J. King Saud Univ., vol. 7, Agric. Sci. (2), pp. 209-227, Riyadh (A.H. 1415/1995).

Lentz, et al., "Polyacrylamide Treatments for Reducing Seepage in Soil-Lined Reservoirs: A Field Evaluation," American Society of Agricultural and Biological Engineers ISSN 0001-2351, vol. 51(2): 535-544, 2008.

* cited by examiner

SELF-SITUATING STIMULI-RESPONSIVE POLYMER COMPOSITIONS IN SOIL ADDITIVES AND METHODS FOR USE

CROSS REFERENCE TO RELATED APPLICATIONS

This application claims the benefit of U.S. Provisional Application Ser. No. 61/072,511, filed Mar. 31, 2008, herein incorporated by reference.

FIELD OF INVENTION

This invention relates to methods and compositions relating to soil additives and, in particular, to self-situating stimuli-responsive polymer compositions in soil additives and methods for use.

BACKGROUND OF THE INVENTION

Water scarcity is a major constraint to human and agricultural development. Roughly 70% of the fresh water consumed is directed towards agricultural-related usage, for example as irrigation water, which in turn accounts for roughly 90% of agricultural usage. As the demand for fresh water through agricultural development as well as human development increases, more effective uses of water are becoming necessary. This need is even more pronounced in light of the increasing scarcity of fresh water. There is also an increasing demand for fresh water in food production and non-food related raw materials such as biofuel, biomass and renewable biomaterials apart from the aforementioned use. Accordingly, there is a growing need for an improved and more efficient usage of fresh water.

Fresh water is lost in agriculture applications through two main pathways: (1) run-off or evaporation and (2) drainage out of plant root zone. With respect to run-off, the slow or arrested penetration of water into soil will lead to run-off of water where the soil area is, in particular, sloped or angled. Another effect is an accumulation of water on a flat/level soil surface, which allows for water evaporation through extended exposure to the atmosphere. The slow permeation is caused by several mechanisms, such as the destruction of a soil's porous structure, as indicated by soil crust formation. Water repellent soil can develop when the soil becomes hydrophobic and substantially or totally resists the infiltration of water into it.

With respect to drainage, the drainage of water out of the root zone may be caused by a low water holding capacity of the soil and/or uneven distribution of water. The soil water holding capacity is determined by the soil texture and amount of organic matter in soil. For example, usually coarse-textured soils, e.g., sandy soils, have a much smaller water holding capacity than fine-textured soils, e.g., loamy soil. The uneven distribution of water can be caused by the application method of irrigation water (e.g. furrow irrigation) and the heterogeneity of soil composition. Preferential flow may also occur in heterogeneous soils, and it funnels the water supply quickly out of the root zone and causes the inefficiency of water usage.

Several approaches were used in an attempt to increase the agriculture water usage in agriculture, one of which was the use of surfactants. It is generally known that surfactants can reduce the surface tension of the irrigation water, but also face drawbacks, for example as disclosed in (among others) U.S. Pat. No. 5,927,003 to Miller et al., incorporated herein by reference.

It is also known that water-absorbent polymers can assist in improving water management. These absorbent polymers otherwise known as superabsorbents are used to increase water usage efficiency. Superabsorbents have cross-linked polymer network structures, which can hold water several to a few hundred times the original superabsorbent volume. Superabsorbents include hydrolysis products of starch-acrylonitrile graft polymers, carboxymethylcellulose, cross-linked polyacrylates, cross-linked polyacrylamides, polyvinyl alcohols, polyacrylonitrile and polyethylene oxide. Several U.S. patents as described below, for example, disclose a variety of polymers used in agriculture for improving water management.

U.S. Pat. No. 4,985,062 to Hughes discloses an aqueous gel of a cross-linked mixed salt of homopolymerized or copolymerized acrylic acid. U.S. Pat. No. 4,559,074 to Clark discloses a substantially non-ionic polyacrylamide cross-linked with a small amount of methylenebisacrylamide (MBE) or other agent. U.S. Pat. No. 4,124,748 to Fujimoto et al. discloses a cross-linked copolymer of a vinyl ester and an unsaturated carboxylic acid ester, neutralized with a potassium or ammonium alkali, for seed culturing media in plants. U.S. Pat. No. 4,320,040 to Fujita et al. discloses a method of preparing hydro-gel polymers from polyvinyl alcohol and polyacrylic acid to be used as a water-retaining agent for plants or soils.

Superabsorbents are applied as soil additives and are typically buried, manually or mechanically, within the vicinity of root zone. As such, these superabsorbents can swell and hold water when irrigation water is applied, and release the water during the irrigation interval or a dry period. Burying of superabsorbents can typically be accomplished by temporarily removing any plants from the soil, typically done through a gardening-type application. However, the drawbacks with large scale undertakings such as widespread turf and in-ground crop applications are obvious, as it is generally impractical or financially infeasible to remove all or most plants and/or top layer of soil. Further, there is a relatively high cost associated with such applications as large amounts of superabsorbents are generally needed to achieve sufficient performance.

Some have tried to address these drawbacks by implementing devices for injecting superabsorbents in situ. For example, some have used modified or standard tilling machines, water-jet injectors, seed drills and coring machines in an attempt to inject polymers into the soil. However, such methods have proved problematic. The previously described methods can disturb topsoil and shock and destroy plants or turf. As such, these methods are largely unsuitable and require superabsorbent insertion before the turf and/or plants have been laid, planted or grown. In addition, these previously described methods often do not distribute the polymers evenly or efficiently, or in the areas that need superabsorbents the most. This is compounded by the fact that historically, suitable polymers can be relatively expensive and previously described applications cannot apply them in a cost-effective manner.

Accordingly, there is a need for an improved soil additive comprising a polymer network that can target the most advantageous or needed locations in soil (thus increasing effectiveness relative to the amount of polymer utilized) and that can provide improved water usage by plants and grasses.

There is also a need for an improved method or mechanism to apply a polymer within soil that has increased efficacy (relative to the total amount of polymer used), can target the most advantageous or needed locations in the soil and can improved water usage efficiency by plants and grasses.

SUMMARY OF INVENTION

The present invention in one aspect is a soil additive comprising a polymer composition having a first structure and a second structure, where the second structure has a volume greater than the first structure. The polymer composition is capable of undergoing an increased volumetric change to the second structure from the first structure upon and initial or prolonged exposure to a stimulus present in soil. In one embodiment, the polymer composition can be a synthetic polymer, a natural polymer, a derivative of any of the foregoing or any combination thereof. The stimulus can be any suitable stimulus to effectuate volumetric change, but typically is pH, a predetermined temperature, an ion, an ion concentration, a solvent, radiation and any combination thereof.

In another aspect, the present invention is a method of increasing water retention in soil comprising applying a soil additive to a soil surface in the form of a first structure. The polymer composition in the form of the first structure is capable of mixing with water or fluid carrier such that the mixture penetrates the soil surface. The polymer can penetrate the soil surface to a predetermined depth or can penetrate for a certain amount of time before the polymer takes the form of the second structure. For the polymer composition to change from the first structure to the second structure, the polymer is in contact with or exposed to the stimulus for a period of time. (I.e., the soil additive comprises a polymer composition that is responsive to a stimulus present in soil.)

In one embodiment, the polymer composition can comprise permanent cross-links and non-permanent cross-links in the first structure, and can comprise permanent cross-links in the second structure. The non-permanent cross-links are removed or substantially removed from the first structure through contact/exposure to the stimulus present in the soil.

In another embodiment, the mixture of the polymer composition (in the form of the first structure) with water or fluid carrier is capable of flowing into one or more water drainage channels located within the soil and, after contact/exposure to the stimulus, the polymer composition increases in volume to the second structure. When the polymer composition is in the form of the second structure, it impedes or arrests the flow of water through the water drainage channels.

In yet another embodiment, the mixture of the polymer composition with water is capable of flowing, within the soil, from an area of high water potential to an area of relatively low water potential. After exposure to the stimulus, the polymer composition (when substantially in the second structure) is capable of effectuating a homogenous distribution of water in the soil relative to distribution of water in the soil prior to application of the soil additive.

In yet another aspect, the present invention is a method of increasing water retention in soil comprising: applying a soil additive, the soil additive comprising a cross-linked polymer composition comprising permanent cross-links and non-permanent cross-links, wherein the non-permanent cross-links are capable of being removed upon exposure to a stimulus within soil which increased the volume of the polymer composition, to a soil surface, wherein the cross-linked polymer composition is capable of mixing with water to form a stable colloidal dispersion or suspension solution that can penetrate the soil surface, and wherein the non-permanent cross-links are thereafter removed by exposure to the stimulus.

In another embodiment, the polymer composition in the second structure is maintained at a depth below the target area surface less than or equal to about 20 feet for a predetermined amount of time. In another embodiment, the polymer composition under the surface of the target area forms a substantially continuous distribution layer having a height of from about 0.1 to about 20 centimeters, typically from about 0.1 to about 3 centimeters. In another embodiment, the polymer composition under the surface of the target area forms a substantially continuous layer having a height of less than about 0.5 centimeters. In yet another embodiment, the first structure comprises a mean particle diameter ($D_{50}$) of from about 0.1 micrometer to about 200 micrometers and wherein the second structure comprises a $D_{50}$ of from about 1 micrometer to about 5000 micrometers. In another embodiment, the method further comprises optimizing the polymer composition to correspond to the mean pore size of soil in the target area. The mean pore size may be a range of pore sizes or a specific pore size.

DETAILED DESCRIPTION OF INVENTION

The present invention is directed to soil additive compositions that comprise a polymer having a first structure or first volumetric size and a second structure or second volumetric size. As detailed in greater detail below, the second structure is slightly to significantly greater in volumetric size than the first structure. Typically the ratio of volume of the first structure to the second structure is from about 1:3 to 1:500, more typically from about 1:5 to about 1:200. Change from the first to second structure is effectuated upon contact with a stimulus in the soil. Typically the stimulus is already present in the soil to be treated.

The volumetric change can be effectuated through any variety of suitable means, some of which will be described herein. It is understood, however, that other suitable means to effectuate volume change of the polymer networks not disclosed herein may also be implemented, so long as the polymer composition is capable of undergoing an increased volumetric change when a stimulus is contacted with the polymer composition or the polymer composition is exposed to the stimulus. Suitable polymer compositions include but are not limited to cross-linked polymers having both permanent and non-permanent (e.g., ionic) cross-links, polymer compositions capable of having both crystalline and non-crystalline structures, polymer compositions interactive with solvent such that its volumetric size is affected by a change of the solvent or removal of contact with the solvent, and the like.

The present invention is also directed to a method of utilizing a self-situating stimuli-responsive polymer composition capable of delivering itself unassisted to a targeted or desired area within the soil.

In one embodiment, the polymer composition is admixed into a solution or suspension and applied to the soil surface. The mixture then migrates into water drainage channels located within the soil. In another embodiment, the polymer composition is admixed into solution to create a suspension or colloid dispersion and applied to the soil surface, and thereafter migrates into areas within the soil having lower water potential (relative to areas of higher water potential in the soil). The polymer composition then undergoes an increase in volume or size, upon contact or exposure to a stimulus in the soil. The increase in volume or size can substantially clog the drainage channels, can clog the areas of relatively lower water potential within the soil, can arrest the flow of water through such channels or otherwise impede or, in other embodiments, arrest the flow of water away from targeted areas or soil.

The term "water potential", as used herein, describes the energy level of water in soil, as generally described in Tan, K. H. Principles of soil chemistry, $3^{rd}$ Ed. Marcel Derkker Inc., 1998. Water potential consists of matric potential, pressure potential, osmotic potential, gravitational potential, and other terms. Water generally flows in soil from areas of high water potential to areas of low water potential.

The term "drainage channels", as used herein, is broadly interpreted and generally means the voids or spaces in between adjacent soil particles, where these voids or spaces are interconnected to define channels, canals, conduits, pathways and the like (hereinafter "channels") which allow for flow of water through these channels and through the soil. The rate at which water flows through these channels depends on the size and/or diameter of the channel. It is understood that channels can vary significantly depending on the make-up of the soil. More specifically, "drainage channels" are the channels of which the cross section is so large and the water flow rate is so high that water is drained quickly out of the root zone and cause the loss of water usage efficiency. In one embodiment, "drainage channels" means the preferential flow paths of water through a hydrophobic soil surface and soil.

The term "self-situating", as used herein, means the capability to migrate or move to a desired general location or area within the soil, whereby the user does not directly cause the object migration or movement within the soil. For example, the polymer composition comprising the present invention, after being admixed with an aqueous solution (to form a suspension or colloidal dispersion) and applied to the soil surface, is capable of migrating to a desired location or area within the soil via flow of the solution (through drainage channels located within the soil or otherwise). In one embodiment, after sufficient time has elapsed, the polymer composition becomes situated at targeted locations or areas within or adjacent to the path of solution flow.

The term "stimuli-responsive", as used herein, means that one or more chemical and/or physical properties can undergo change, typically a sizeable change, when a stimulus is introduced or applied. More specifically, with respect to one embodiment of the present invention, "stimuli-responsive" means a volume change, typically a sizeable or dramatic volume change, of the polymer network of the present invention when a stimulus is applied. For example, the non-permanent cross-links of one embodiment can interact with an external force such as the flowing of a chemically reactive solution or other stimulus that can cleave, break or remove these cross-links (wherein the nature and degree of cross-linking maintains the integrity of these polymer networks).

The term "permanent cross-links", as used herein, means permanent chemical cross-linked bonds, typically stable covalent bonds, among the polymer chains comprising a polymer network, or whereby the cleavage of the cross-linked bonds requires a significant amount of time (e.g., slow hydrolysis taking a few months). Such permanent cross-linked bonds cannot be easily cleaved, broken or removed (hereinafter, "removed") under the conditions of this application.

The term "non-permanent cross-links", as used herein, means cross-linked bonds among the polymer chains comprising a polymer network, which are semi-permanent in nature. These cross-linked bonds, including but not limited to ionic cross-links and cleavable covalent bonds (via, e.g., hydrolysis, enzymolysis, redox), can be readily cleaved, broken or removed under normal soil conditions. The term bond, as used in this application, should be construed broadly and includes generally intermolecular and intramolecular forces such as covalent bonding, ionic interaction, hydrophobic interaction, hydrogen bonding, ionic complexation, antigen-antibody, metal coordination, London dispersion forces and other intermolecular forces.

The soil additives of the present invention can be utilized in any suitable form, typically when the stimuli-responsive polymer networks is suspended or colloidally dispersed in an aqueous solution. In one embodiment, the soil additive is in powdered form capable of being mixed with water or oils used in agriculture application or green solvents. In another embodiment, the soil additive is in the form of gels and microgels. The particle size of the polymer network can vary depending on many factors, including but not limited to, soil physical and chemical characteristics, soil microbial characteristics, soil type, soil density and variations thereof within the targeted soil, and dimensions of water drainage channels in the soil. In one embodiment, the mean particle diameter ("$D_{50}$") of a particle of the polymer composition is proportional to the mean channel diameter of the soil drainage channels. In another embodiment, the mean particle diameter ("$D_{50}$") of a particle of the polymer composition is proportional to the mean granular diameter of the targeted soil. Particles comprising the first structure polymer network (i.e., in collapsed form) may exhibit a $D_{50}$ of from about 0.1 micrometers ("μm") to about 1000 micrometers, typically from about 1 μm to about 500 μm, and more typically from about 30 μm to about 200 μm, as determined by light scattering or optical miscroscopy. Particles comprising the second structure polymer network (i.e., in swollen form) may exhibit a $D_{50}$ of from about 1 μm to about 5000 micrometers, as determined by light scattering or optical miscroscopy. It is understood that the $D_{50}$ range also depends on the properties of the soils to be applied. For example, with respect to sandy soil applications, polymer network particles may exhibit a $D_{50}$ in the range from about 1 to 100 μm, more typically from about 5 to 50 μm in collapsed form (i.e., first structure).

The polymers that have found particular utility in the present invention comprise any suitable synthetic polymer, natural polymer, derivatives thereof or any combination thereof, as will be described in greater detail below.

Synthetic Polymers Natural Polymer Derivatives and Porous Inorganic Materials

In one embodiment, cross-linked polymer compositions suitable for the present invention are synthetic polymer networks. The synthetic polymer networks can undergo sizeable volume change by taking/absorbing significant amounts of water. Although there is no limitation as to the shape of the polymer network, the particles comprising the network are typically granular, which will be controlled by the production processes. The degree of cross-linking of these polymer networks can be controlled to provide the desired elastic modulus relative to the ion osmotic pressure and water gravity pressure, among others factors, in the targeted soil type (e.g., loamy, sandy, etc), which would allow for acceptable volume change of the polymer network.

The composition of these synthetic polymeric networks is not particularly limited and can be homopolymers, as well as random or block or any other types of copolymers made from any polymerizable monomer. With respect to one embodiment, it is understood that these synthetic polymer networks are polymerized wholly or partially from any suitable polymerizable monomer having functional groups that can allow non-permanent cross-links to form.

The polymerizable monomers are typically water-soluble chargeable monomers having carboxylic groups, sulfonate groups, phosphonate groups and the like.

In one embodiment, the polymerizable monomers having one or more carboxylic groups include but are not limited to acrylic acid, methacrylic acid, crotonic acid, sorbic acid, maleic acid, itaconic acid, cinnamic acid, its salt or the like, or an anhydride thereof (maleic anhydride or the like). These carboxylic acid-containing monomers are characterized by electrostatic repulsion and thus the capability of volumetric expansion upon incorporation into the polymer network and neutralization, and can bind to multi-valent cations reversibly to provide sizeable volume change.

The polymerizable monomers include also neutral, typically water-soluble monomers or monomers that are precursors of hydrophilic units, such as radically polymerizable acrylates, methacrylates, acrylamides, methacrylamides, vinyl alcohol, allyl alcohols, vinyl acetates, betaine-containing vinyl monomers (including but not limited to carboxyl betaines and sulfobetaines), and other ethylenically unsaturated monomers. The polymer networks can also include component polymers from other polymerization techniques such as condensation, anionic polymerization, cationic polymerization, ring opening polymerization, coordination polymerization, metathesis polymerization, etc., as exemplified by poly(alkylene oxides) (including but not limited to poly(ethylene glycol), poly(propylene glycol), and polytetrahydrofuran), polyglycerol, polyamine, polyester, polyamide, derivatives of any of the foregoing and/or copolymers of any of the foregoing.

In one embodiment, the polymer compositions suitable for the present invention are natural polymer derivatives, typically polysaccharides. These natural polymer derivatives can undergo sizeable volume change by taking/absorbing significant amount of water when exposed to a stimulus typically within the soil, as will be described in greater detail below. The particle size control of these polysaccharide derivatives can be determined by either the native polysaccharide starting granules and/or the production processes. There is no limitation to the shape of the polymer network, but typically granular shape, which will be controlled by the production processes.

Functional groups, typically water-absorbing groups, and more typically chargeable groups such as carboxylic groups, can be attached to the polysaccharide. The attachment of functional groups to polysaccharides can be established through grafting, complexation, covalently binding, and chemically transforming, and the like. The attachment of the functional groups can enhance the magnitude of volume change of the polymer networks upon neutralization, and can bind to multi-valent cations reversibly to trigger volume change. The degree of cross-linking of these polysaccharide derivatives can be controlled to provide a desired elastic modulus relative to the ion osmotic pressure and water gravity pressure in a targeted soil type.

Examples of suitable polysaccharides include but are not limited to galactomannan polymers, guar, starch, dextrins, chitin/chitosan, alginate compositions, cassia gum, tara gum, xanthan gum, locust beam gum, carrageenan gum, gum karaya, gum arabic, hyaluronic acids, succinoglycan, pectin, crystalline polysaccharides, branched polysaccharide, cellulose, as well as other derivatives thereof such as ionic and/or non-ionic derivatives and other derivates of any of the foregoing.

Examples of suitable guar include but are not limited to guar gum, hydroxypropyl guar gum, carboxymethyl guar gum, carboxymethylhydroxypropyl guar gum, and other modified guar gums.

Examples of suitable cellulose include but are not limited to hydroxycelluloses, hydroxyalkyl cellulose, including hydroxyethyl cellulose, carboxymethylhydroxyethyl cellulose, hydroxypropyl cellulose, carboxymethylcellulose and other modified celluloses.

Examples of suitable starch sources include but are not limited to corn, wheat, rice, potato, tapioca, waxy maize, sorghum, waxy sorghum, sago and modified starches. Examples of modified starches include dextrinated, hydrolysed, oxidized, crosslinked, alkylated, hydroxyalkylated, acetylated, fractionated (e.g. amylose and amylopectin), and physically modified starches, among others.

In one embodiment, the soil additive composition is comprised of any suitable natural polymer, synthetic polymer or combination thereof, as well as inorganic material, typically a porous inorganic material. Suitable inorganic materials include but are not limited to clays, diatoms, silicates, silica, carbonates, gypsum, and any combination thereof. Such inorganic materials may be porous or non-porous and, in one embodiment, are utilized to increase the efficacy of the polymer composition. It is noted however that inorganic materials have the least swellability relative to the synthetic polymers and/or natural polymers disclosed, and may not be desirable in some applications.

Surfactants

In one embodiment, the soil additive is comprised of any suitable cross-linked polymer or combination of natural and/or synthetic polymers as described herein, a porous inorganic material, at least one surfactant or any combination thereof. Surfactants can be used in some applications to facilitate the infiltration of water into soil, for example, where there is a water-repellant or hydrophobic soil layer or layers. In such an instance, water tends to flow laterally above the hydrophobic layer and then is redirected to drainage channels (e.g., preferential flow channels), which leads the water through the hydrophobic layer. This effect, also known as distribution flow or fingered flow, decreases uniform wetting beneath the hydrophobic layer, but can be counteracted through use of surfactants as surface active agents.

Method of Creating the Polymers of the Present Invention

The production processes of the primary polymeric soil additives in the present invention are generally known in the art. Methods for making suitable synthetic polymer networks are documented in U.S. Pat. No. 5,202,400, U.S. Publication No. 20040024104, and WO Patent No. 2006131213. Synthetic polymer networks can be made from radical polymerization, condensation, anionic polymerization, cationic polymerization, ring open polymerization, coordination polymerization, and metathesis polymerization, and the like. Examples of suitable radical polymerization processes include but are not limited to solution polymerization process, emulsion polymerization process, suspension polymerization process, reverse-phase suspension polymerization process, thin film polymerization process, and spray polymerization process, and the like. The particle size can be controlled by managing certain polymerization conditions and/or following by pulverization process.

In one embodiment, and as a general procedure of inverse suspension polymerization, the surfactant is mixed with the organic solvent (eg. paraffinic oils, etc). The monomers and cross-linker are dissolved in water. The aqueous solution is poured into the organic solvent under stirring. The system is heated to a temperature. Initiator solubilized in the organic solvent was added and allow the initiation and completion of polymerization to produce the final polymer networks.

Methods for making suitable natural polymer derivatives are also generally known in the art. The cross-linking processes of polysaccharides were described in US Publication No. 20030027787 and U.S. Pat. No. 5,532,350. The attachment of functional groups to polysaccharides can be processed in similar conditions described.

Methods for cross-linking polymers are generally known in the art. In some embodiments, creating the cross-links of the present invention involves copolymerization with polymerizable cross-linkers. In other embodiments, creating the crosslinks of the present invention comprises employing a crosslinking reaction after polymerization. For example, the permanent chemical bonds forming the polymer network can be made by subjecting the crosslinkable polymer to high energy radiation (e.g. gamma rays and UV) and electron beams, or treatment with a chemical crosslinking agent with reactive groups present in the polymer such that covalent bonds are formed connecting the polymer network. Another crosslinking mechanism useful with respect to some types of polymers is physical crosslinking which is typically accomplished by crystal formation or similar association of polymer blocks. In this mechanism, the polymer molecules are physically tied together and prevented from complete dissolution.

Other methods for creating permanent crosslinking bonds include contact of the crosslinkable polymer with a chemical crosslinking agent. The degree of chemical bond cross-linking can be managed by varying the concentration of the cross-linking chemical agent in the reaction mixture. Generally, the higher the concentration of crosslinking agent, the higher the degree of crosslinking. Suitable crosslinking agents are compounds having two or more functional groups that can react with other functional groups present in the polymer. The crosslinking agent typically contains two or more functional groups from carboxyl, hydroxy, epoxy, azilidine, halogen, vinyl, and amino groups which are capable of undergoing substitution, addition, ligation and condensation reactions at varying temperatures and other conditions. In one embodiment, click chemistry is used to create crosslinks. Permanent crosslinks may be carried before, after or during the occurrence of non-permanent crosslinking. It is also understood that any reaction that can create a stable connection between a crosslinker and a polymer can be used for the crosslinking reaction of the present invention.

The non-permanent cross-links can be created from a variety of bonding, including but not limited to hydrogen-bonding, ionic interaction, hydrophobic interaction, ionic complexation, antigen-antibody, metal coordination and the like. In one embodiment, the non-permanent cross links comprise ionic cross-links created from ionic complexation of polymer chains in the presence of water and a divalent or multi-valent cation. The crosslinking agents used to form the ionic cross-links may be any suitable crosslinking agent, which, in one embodiment, is a cross-linking ion such as an anion or cation, and more typically a cation. The use of a cross-linking anion or cation may depend on the properties of the utilized polymer (e.g., whether the polymer is anionically or cationically crosslinkable). Appropriate crosslinking ions include but are not limited to calcium, boron, beryllium, magnesium, iron and copper ions. Anions include but are not limited to phosphate, citrate, borate, succinate, maleate, adipate and oxalate ions. Generally, the crosslinking ions utilized are cations, typically, calcium, and magnesium ions, and more typically, calcium. Ionic complexation may be carried out by contacting the polymers with an aqueous solution containing dissolved ions.

In order to cleave, break or remove these ionic cross-links, any suitable stimulus may be used. Typically, the suitable stimulus is already present in the soil in sufficient quantities so as to cleave, break or remove the ionic cross-links. This, in turn, effectuates a substantial increase in the volume of the crosslinked polymer network. In another embodiment, a stripping agent is utilized and capable of displacing, sequester or binding the crosslinking ions present in the ionically crosslinked polymer. The choice of a stimulus is dependent on the cross-linking ion.

In another embodiment, the stimulus for removal of non-permanent ionic cross-links is the replacement of a divalent or multivalent cation with a monovalent cation. The introduction or exposure to the stimulus results in removal of many or substantially all of the ionic crosslinks present in the polymer composition, which typically increase the volume of the network by a factor of $10^1$ to $10^3$, and more typically by a factor of $10^2$. Typically, the monovalent cation is a potassium ion, a sodium ion or an ammonium ion.

The said self-situating stimuli-responsive polymer networks comprising the present invention can be modified to be in a substantially collapsed or swollen volumetric size. As described in one embodiment, the polymer networks can have a first structure (i.e., a compacted volume) and a second structure (i.e., an expanded volume). In the first structure the polymer networks comprise two types of cross-linking: (1) the permanent cross-linking bonds and (2) the non-permanent cross-linking bonds. The first structure can be created using any suitable method including the embodiments described herein. In the second structure, the polymer networks substantially comprise one type of cross-linking, namely, permanent cross-linking bonds. A characteristic of the polymer compositions of the present invention is that the ionic cross-linking bonds can be selectively displaced after penetration of the polymer compositions into the soil. This results in volume change of the polymer compositions in the soil, which enhances the capability to clog drainage channels and absorb water.

The non-permanent cross-linking bonds can either be physical cross-linking or cleavable chemical cross-linking or both, which offers stimuli-responsive properties of these polymer networks. The permanent cross-linking bonds provide enough elastic modulus to the polymer network to achieve clogging in order to halt or slow down drainage flow. It is understood, however, that polymer networks can have several structures including but not limited to substantially collapsed, partially collapsed, partially swollen and/or substantially swollen structures and, thus, are not limited to only the two disclosed structures above.

The method of utilizing the polymer composition of the present invention will be discussed below. In one embodiment, the present invention is a method of utilizing a self-situating stimuli-responsive polymer composition as or as part of a soil additive that can penetrate into the soil and can undergo phase transition by increasing the polymer composition's volume once entering into the soil. That is to say, once the polymer composition penetrates the soil and, in one embodiment, is introduced into the drainage channels, it transitions from the first structure to the second structure. This transition to the second structure, substantially or to a large extent, clogs the drainage channels within the soil (typically within or, more typically, towards the bottom of the plant root zone) to slow down the drainage of water from the soil area. This results in, among others, a more even distribution of water in the targeted area (e.g., the plant root zone).

More specifically, in this embodiment, the method of increasing water retention in soil comprises preparing any suitable cross-linked polymer composition having permanent cross-links and non-permanent cross-links as described above. In one embodiment, the soil additive of the present invention comprising a cross-linked polymer in powder, particulate or gel form. The soil additive is applied to the top surface of desired area of soil through any suitable means including generally available dispensing devices. The powder, particulate or gel form of the polymer composition remains on the surface until dispersed in water or solution later applied to the top surface through irrigation, rainfall or the like. It is also understood that the soil additive can be admixed in an aqueous solution, after which the aqueous solution is applied to the top surface of the soil. These polymer networks have optimized dimensions suitable for entering and then clogging the drainage channels, and are stabilized to prevent aggregation, which will be discussed in following paragraph.

The particle size of the polymer networks of the present invention is proportional to size of the drainage channels. Typically, the mean particle diameter is proportional to the mean channel diameter of the soil drainage channels, which is largely dependant on the type of soil. In one embodiment, the mean particle diameter of the collapsed networks (i.e., first structure) is smaller than the mean channel diameter of the drainage channels, while the mean particle diameter of the swelled networks (i.e., second structure) is greater than the mean channel diameter of the drainage channels. In the first structure, the polymer network is capable of relatively unimpeded flow through the drainage channels. Conversely, in the second structure, the polymer network is impeded from flowing easily through the drainage channels due to its expanded volume and relatively greater cross-sectional area compared to that of the drainage channel.

In another embodiment, the size of the polymer networks of the present invention is proportional to the general size of soil particles to which they are to be applied. In such an embodiment, the polymer networks of the present invention tend to flow with the aqueous solution from higher water potential areas to relatively lower water potential areas, within the soil. As such, the polymer networks need not be directed along or within preferred flow pathways.

The drainage channel size depends on the soil texture and soil structure. In one embodiment, a well-characterized sand sample was used as a model system for typical sandy soil. This sand sample generally is characterized by round grains with particle sizes ranging from 177 micrometers to 707 micrometers, with most of the particles particle (93%) between about 297 micrometers and 500 micrometers. A corresponding drainage channel size is about 80 micrometers. The size of the drainage channels can be affected by many factors such as the organic matter content, the soil history, the cultivation activity, the vegetation, and local climate, etc.

Non-permanent cross-linking can provide "attraction" inside polymer networks and between polymer networks. In the case of the latter, aggregation forms which is an undesired side effect. One method to prevent "attraction" between networks is generally to modify the surface which frustrates the formation of aggregation. To prevent aggregation, the said stimuli-responsive polymer networks are, in one embodiment, surface-functionalized to provide these polymer networks with a stable structure in both collapsed and swelled form. Methods for creating surface functionalization/modification are generally known in the art. Surface functionalization/modification can introduce electrostatic repulsion, steric repulsion, etc. to prevent aggregation. Typically, the polymer networks are surface-functionalized before the application of soil additives to the soil.

Surface modification can be carried out by either physical absorption or chemical reaction. In one embodiment, monoamine terminated poly(ethylene glycol) with a molecular weight of ca. 2,000 Daltons can be reacted with the carboxylic acid groups by carbodiimide-facilitated reaction on the surface of poly(acrylic acid)/polyacrylamide-based superabsorbent polymer network particles to create a dense neutral layer. This repulsion between the poly(ethylene glycol) protecting layer on the surfaces of these polymer networks prevents their unwanted aggregation in concentrated areas and aids in the even distribution of the polymer networks along or within the desired flow path. In another embodiment, 3-amino-1-propane sulfonic acid is reacted with the carboxylic acid groups by carbodiimide-facilitated reaction on the surface of poly(acrylic acid)/polyacrylamide-based superabsorbent polymer network particles to create a charged protecting layer. In another embodiment, a sulfonicated polymer with ω-amino functional group is reacted with the carboxylic acid groups by carbodiimide-facilitated reaction on the surface of poly(acrylic acid)/polyacrylamide-based superabsorbent polymer network particles to create a charged protecting layer. This charge repulsion between the polymer networks prevents their unwanted aggregation in concentrated areas and aids in the even distribution of the polymer networks along or within the desired flow path.

The soil additive comprising a cross-linked polymer composition can then applied to the soil. Typically, the soil additive can be applied any particular form or application including but not limited to a dry particulate, gel, hydrogel, or admixture in an aqueous solution. When applied to the soil, the stimuli-responsive polymer networks are in a first, collapsed form (e.g., having both permanent and non-permanent cross-linking). The colloidal dispersion or suspension of polymer can readily penetrate the soil along with the aqueous solution, believed to be the effect of the collapsed polymer network's small volume and size. When applied with irrigation water or applied on soil surface before precipitation, the soil additive, and more specifically, the polymer networks, can mix with and flow with water to penetrate into the soil.

As described previously, in another embodiment, the soil additive includes a surfactant. The surfactant is particularly useful when applying the additive to soil having a hydrophobic layer (e.g., a hydrophobic layer on the surface). Because of its tendency to repel water, such hydrophobic layer may (i) reduce infiltration of water into the soil and/or (ii) promote only localized infiltration resulting in uneven percolation/distribution (e.g., fingered flow) of water. As described above, water tends to flow laterally above the hydrophobic layer and then is redirected to preferential flow channels (i.e, drainage channels), which leads the water through the hydrophobic layer. This effect, also known as distribution flow or fingered flow, decreases uniform wetting beneath the hydrophobic layer, but can be counteracted through use of surfactants as surface active agents.

By applying a stimulus or by exposure to a stimulus, the non-permanent cross-links are removed and the volumetric size of the cross-linked polymer composition is increased from the first structure to the second structure. More specifically, once the polymer composition has penetrated the soil, the polymer network (in the first structure) will undergo stimuli-responsive phase transition. The stimulus can be any type or combination of different types of environmental or physical-chemical factors that triggers the lost of non-permanent cross-linking and, thus, induces the polymer network volume change to the second, swollen structure. In one embodiment, the stimulus is originated from the inherent properties of the soils. The physical and/or chemical properties/conditions of the polymer network comprising the soil additives are generally different from that found in the soil. For example, the soil additives can have a high concentration of calcium ion, while the soil has low concentration of calcium ion but relative high concentration of sodium ion. This difference in ion concentration is stimulus. Once the soil additives are applied to soil, it will undergo ion exchange. Stimuli-response is automatically exerted by soil. The ion exchange kinetics of calcium-sodium exchange can, for example, be controlled using one or more parameters parameters, typically at least three parameters: the initial concentration difference, the surface cross-linking density, and the thinness and density of surface passivation layer. It is understood however, that more or less than three parameters may be utilized, depending on a variety of factors including soil type, soil characteristics, etc.

In one embodiment, the polymer network soil additives comprise carboxylic acid groups inside the network from either carboxylic group-containing monomers or attached as functional groups to polysaccharides. The presence of a divalent cation, for example a calcium ion, within or adjacent the network will bind to multiple carboxylic functional groups present on the polymer network. As the calcium ion is divalent, the polymer network will shrink or contract due to multiple interactions between the calcium ion and multiple carboxylic groups. The degree of the shrinkage of the network depends on the total concentration of the calcium ions and the carboxylic groups inside the network.

The compacted networks (i.e., first structure) will have a significantly smaller size compared with the soil drainage channels, and the compacted networks are able to flow with the water into the soil and soil drainage channels. The expanded networks (i.e., second structure) will have significantly larger size comparing with the soil drainage channels. As the bond between divalent calcium ions and carboxylic groups in the network is non-permanent, calcium ions are capable of diffusing out of the network when, for example, a mono-valent sodium ion is present. In such an instance, the introduced sodium ions and present calcium ions undergo ion exchange or a replacement process. Sodium ions could induce expansion of the network due to its mono-valency, as sodium ions are not capable of multiple interactions with carboxylic groups present on the polymer network. This diffusion of calcium ion out of the network will cause the volume expansion of the network. The rate of the network volume expansion is determined by the diffusion speed of calcium ion out of the network. The diffusion speed of calcium ion out of the network is affected by several factors included but not limited to initial calcium ion concentration, the binding coefficiency of the carboxylic group to calcium ions, the surface cross-linking density, and the thinness and density of surface passivation layer. By managing factors, including any of those mentioned above, the diffusion speed of calcium ions out of the network can be controlled. In other words, the timing of the volume expansion of the polymer network can be controlled. By controlling the timing of the network expansion comparing with the drainage rate with water along the drainage channels, the depth of network deposition by drainage can be controlled.

Aside from ion type and concentration, other suitable stimuli includes but is not limited to pH value, temperature, solvent type, flow rate, surface properties, radiation, microenvironment parameters, and other physical-chemical properties from either soil or external sources. In one embodiment, the stimulus is exposure to the atmosphere or other external parameters that, once applied to the soil, effectuates partial biodegradation of the polymer composition resulting in volume expansion.

The loss of the non-permanent cross-linking can induce an increase of the polymer network volume, which will become large enough to be able to clog the drainage channels, and finally stop at a predetermined depth into the soil, typically just under the plant root zone. In one embodiment, the depth at which the polymer composition will undergo a volume change (e.g., from substantially the first structure to substantially the second structure) is no greater than 20 feet below the soil surface, more typically within 1 to 6 feet. The root zone generally varies, among other factors, depending on plants, soil type, soil history, cultivation activity, and the like, but is typically less than about 20 feet below the soil surface.

The time it takes for the polymer composition solution to flow to the desired depth depends largely on the water penetration rate. The water penetration rate depends on many factors such as soil moisture content, soil texture, soil structure, cultivation activity, soil history, and organic matters in soil, etc., which can vary greatly.

Soil hydraulic conductivity, $K_s$, is an important parameter in soil science and is a term closely related to water penetration rate. Experiments used to determine hydraulic conductivity are exemplified in D. O. Johnson et al., Automation of a Falling Head Permeameter for Rapid Determination of Hydraulic Conductivity of Multiple Samples, Soil Sci. Soc. Am. J. 69:828-833 (2005) and M. Th. Van Genuchten, A Closed-form Equation for Predicting the Hydraulic Conductivity of Unsaturated Soil, Soil Sci. Soc. Am. J. 44:892-898 (1980), hereby incorporated by reference. Soil samples can be taken from a targeted area to determine the water penetration rate of the targeted soil and, according to experiments according to or similar to those described herein, hydraulic conductivity can be determined. Time of desired soil depth penetration can be determined using hydraulic conductivity of the targeted soil. This will allow the control of the synthesis of the polymer composition of the present invention (for example the degree of cross-linking, such that the polymer composition is capable of changing volume at a certain depth, time or a combination thereof) to reach and expand in volume at a certain desired depth or at a certain time, depending on soil characteristics.

The clogging and slowing down of drainage flow using the composition and methods of the present invention can reduce water lost, provide more water for plant usage, increase water usage efficiency and improve even distribution of water. As compared to current methods of dispensing large amounts of superabsorbent polymer compositions, only a fraction of the self-situating stimuli-responsive polymer composition (employed in the disclosed soil additive of the present invention) need be used to achieve similar soil water retention rates.

The present invention addresses the retention of water in at least two ways, through absorption/retention of water within the polymer networks and through its use as a drainage clogging agent. This results in water retained in and above the drainage channels as a source of saved water that can be utilized by nearby plants, grasses, vegetation, etc. The soil water content can be increased by more than 5%, typically more than 10%, and most typically by more than 15% by clogging the water drainage channels. In one embodiment, an application rate in the range of about 1-20 kg/hectare, more typically in the range of about 10-15 kg/hectare, of the polymer composition is needed to sufficiently clog the drainage channels such that the soil water retention rate is increased to greater than about 50 tons/hectare.

The polymer compositions disclosed in the present invention are cost-efficient due to their high efficiency. In other words, through the self-situating mechanism of the polymer composition of the present invention, less of such polymer compositions need to be utilized to achieve the same or greater retained water volume for plant, grass and vegetation usage. In addition, no extra manipulation of the ground, e.g., tilling, seed drilling, etc., is needed because these polymer networks can be self-situated and can undergo stimuli-triggered volume change. Further, there is minimum leaching of the said polymer network due to, among other factors, the polymer networks' relative size compared with surfactants. The minimizing of leaching comes from at least two aspects: 1) the size of the polymer network is $10^3$ to $10^5$ times larger than that of surfactants. The soil media provides a physical barrier for the polymer networks to reach the water reservoirs; 2) the amount of applied polymer networks will be much smaller than that of surfactants to reach the same effect. This also reduces the relative amount of leaching. While theoretically, the polymer composition comprising the present invention is a reversible process (i.e., reforming the ionic cross-links, followed by removing the ionic cross-links, followed by reforming of the ionic cross-links, as so forth), under natural condition such a reversible process is largely unattainable due to insufficient divalent cations (e.g., calcium ions) located naturally in the soil. In other words, typically there is initially a much higher concentration of divalent cations (e.g., calcium ions) in the polymer composition than cannot be found naturally occurring in the soil, and thus the reverse process is largely unattainable.

The stable stimuli-responsive soil additives of the present invention can be produced via the modification of the synthetic and/or natural polymers generally available from industrial processes. This modification processes include but not limited to surface modification, post-production functionalization, particle size selection processes, volume control via loading of multi-valent inorganic ions, and combination of any of these. In one embodiment, the selected superabsorbent polymer was performed surface-only modification to create a protection layer on the surface. These surface modified superabsorbent polymers were allowed to swell in a select solvent (eg. de-ionized water). Calcium ion solution of controlled concentration was mixed with these swelling superabsorbent polymers to create a shrunk but discrete hydrogels. In one embodiment, natural polymers were functionalized with charged species or functional groups. These functionalized natural polymers were swollen in a select solvent (eg. de-ionized water), and allowed to contact with calcium ion solution of controlled concentration to create a shrunk but discrete hydrogels. In one embodiment, a synthetic and/or natural polymer was allowed to contact with calcium ion solution of controlled concentration that would limit the swelling of the polymer. Treatment of this mixture (eg. heating, pH, and solvent) would facilitate the diffusion of calcium ions into the polymers while maintaining the relative volume and discreteness of the polymer particles.

Experiments

In an experiment, partially chemically cross-linked poly(acrylic acid) sodium salt networks were suspended in an aqueous solution. The introduction of divalent inorganic ions, e.g. calcium ion, into the above suspension caused a volume decrease of swollen polymer networks into a collapsed structure. Without being limited by theory, it is believed that the calcium ion solution promoted ionic cross-linking of the polymer composition, thus decreasing the volumetric size of the polymer composition. The volume decrease from the swollen polymer network (i.e., second, expanded structure) to the collapsed polymer network (i.e., first, collapsed structure) was more than 100-fold. These collapsed polymer networks were found to be able to recover to form the swelling state (i.e., second, expanded structure) by applying monovalent inorganic ion solution, e.g. sodium ion solution. It is believed that the sodium ion solution removed many of the ionic cross-links in the poly(acrylic acid) sodium salt networks, thus leaving the networks comprised mostly of covalent or permanent cross-links. These tests demonstrated one of the embodiments of the self-situating stimuli-responsive polymer networks with volume change by ion-exchange.

The drainage flow rate in soils can be greatly affected by the volume change of the stimuli-responsive networks in the soils. As part of the experiment, partially chemically cross-linked poly(acrylic acid) sodium salt networks were incorporated into a soil column. It is believed that the cross-linked poly(acrylic acid) sodium salt networks comprised mostly covalent or permanent cross-links. The drainage rate was tested as a baseline. A calcium ion solution was then introduced into the soil column. The introduction of calcium ion solution into the soil column increased the drainage rate. As stated above, it is believed that the calcium ion solution promotes ionic cross-linking of the polymer composition, thus, decreasing the volumetric size polymer composition to open the drainage channels and increase the drainage rate. Next, a sodium ion solution was introduced into the soil column. It was observed that the introduction of the sodium ion solution decreased the drainage rate by more than 100 times. These tests demonstrated that the drainage channels in soils can be clogged by applying stimulus to a stimuli-responsive polymer network incorporated into the soil. Thus, the drainage flow rate can be affected by several orders of magnitude.

The application of self-situating stimuli-responsive polymer networks in soil additives increases the efficiency of water usage in agriculture by, in one aspect, clogging water drainage channels located within the soil. By clogging drainage channels in the soil and substantially decreasing the drainage of water out of the root zone, increased amounts of water are provided for plant, grasses, etc. For example, water maintained above the clogging zone will be available for plant and grass usage. Additionally, the clogging of main drainage channels may allow for more water to penetrate into channels of small cross section in the targeted area, which is usually a slow process. The flow of water into small channels increases the soil water content and causes homogenous water distribution. While maintaining water above the clogging zone, which is typically adjacent or within the root zone, the water eventually drains (albeit slowly) from the clogging zone such that no perched water table (which is harmful to plants) is formed. As a further example, water absorbed by the cross-linked polymer compositions comprising the present invention (i.e., superabsorbents) will be available for plant and grass usage.

It is understood that the soil additives of the present invention can comprise any combination of a synthetic polymer, natural polymer, porous inorganic material, surfactant, or any combination thereof. It is also understood that the soil additive is not limited to any particular form or application, which includes but is not limited to dry particulate, gel, hydrogel, an admixture of the polymer composition in an aqueous solution. In one embodiment, the self-situating, stimuli-responsive polymer network comprising the present invention can be made from either synthetic polymers or via functionalization of natural biopolymers or a hybrid of these two. It is desired that the stimuli-responsive polymer networks to last for at least one agriculture season. However, it is understood that the polymer network comprising the present invention may last for any number of years depending on the polymer composition utilized, the type and degree of non-permanent and permanent cross-linking, and the like, etc.

EXAMPLE 1

Figure 1:
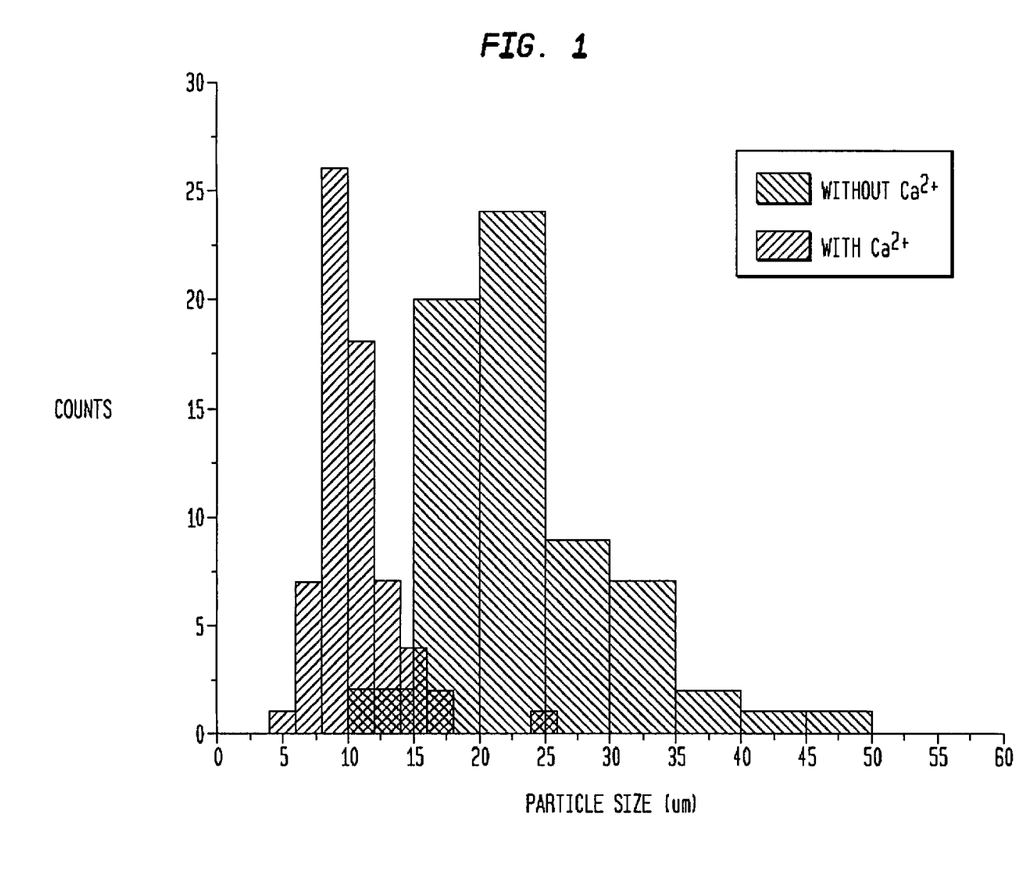
FIG. 1 is a graph showing particle size histogram of hydrogels in a shrunken state (with $Ca^{2+}$) and in a swollen state (Without $Ca^{2+}$).

Referring to FIG. 1, hydrogel particles swelling or shrinking under the contact with calcium ion are observed.

Functionalized starch hydrogels (ca. 0.1 grams) were suspended in de-ionized water (ca. 50 milliliters) and stirred overnight to allow these hydrogels to fully swell. A small portion of the above suspension (ca. 100 microliters) was injected through a syringe into a microfluidic system, which was mounted on an optical microscope and had an observation window in the size of roughly 0.8 cm×4.0 cm. A small amount of calcium chloride solution (1 M, 100 microliters) was injected into the microfluidic system to induce the shrinkage of the hydrogels. The swelling of these shrunk hydrogels was carried out by the following protocol: Flush the microfludic system containing shrunk hydrogels with about 10 milliliter de-ionized water. A small amount of sodium chloride solution (ca. 1 M, 500 microliters) was flushed through the microfluidic system. Images of swollen and shrunk hydrogels were taken and analyzed. The dimension of these swollen and shrunk hydrogels is shown in FIG. 1

EXAMPLE 2

Figure 2:
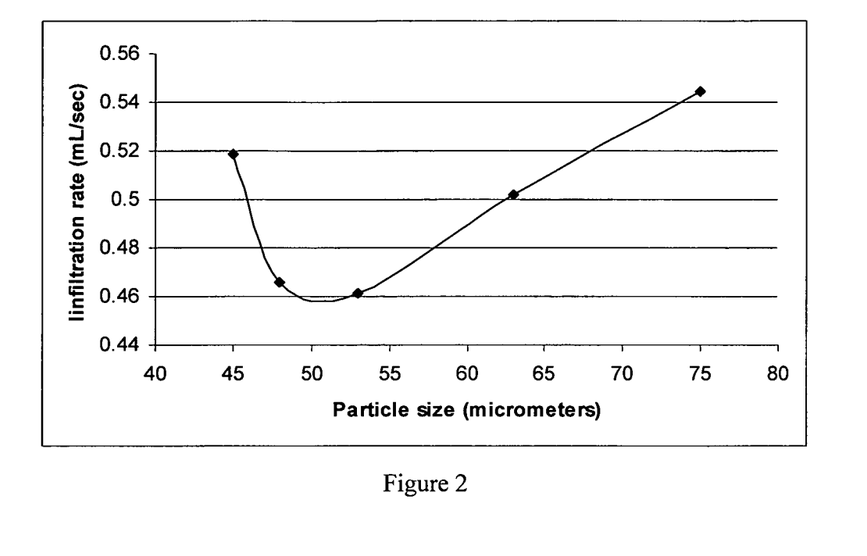
FIG. 2 is a graph showing the infiltration rates of soil columns homogeneously mixed with hydrogels of varied particle size.

Referring to FIG. 2, the influence of hydrogel particle size on the clogging efficiency is observed, where it was hypothesized that modification of hydrogel dimension size related to soil pore size can control the clogging efficiency.

Generally for soil column testing, 250 grams of sand was filled into a column (with or without the present of water). With a gentle tapping, a pre-determined soil packing density (eg. 1.8 g/cm$^3$) was achieved. Water or testing solutions were added to the top of soil column and maintained at a fixed level by Mariotte's bottle to achieve a constant pressure head. The water flow through the column was collected in a container which sat on a balance. The reading was collected and stored in a computer to provide data to calculate flow rate or hydraulic conductivity.

Stacked sieves with varied mesh sizes were loaded with hydrogel particle powder (ca. 50 grams), and mounted on a shaker. A few hours of shaking operation allowed the separation of hydrogels into fractionations of varied particle sizes. Each hydrogel fractionation (ca. 10 milligrams) was mixed homogeneously with sand (ca. 250 grams), and then packed into a column. A standard soil column test was performed to measure the flow behavior of sand columns with each fractionation. The infiltration rate of sand columns with hydrogels of varied particle sizes were measured under the identical condition, and result shown in FIG. 2.

EXAMPLE 3

Figure 3:
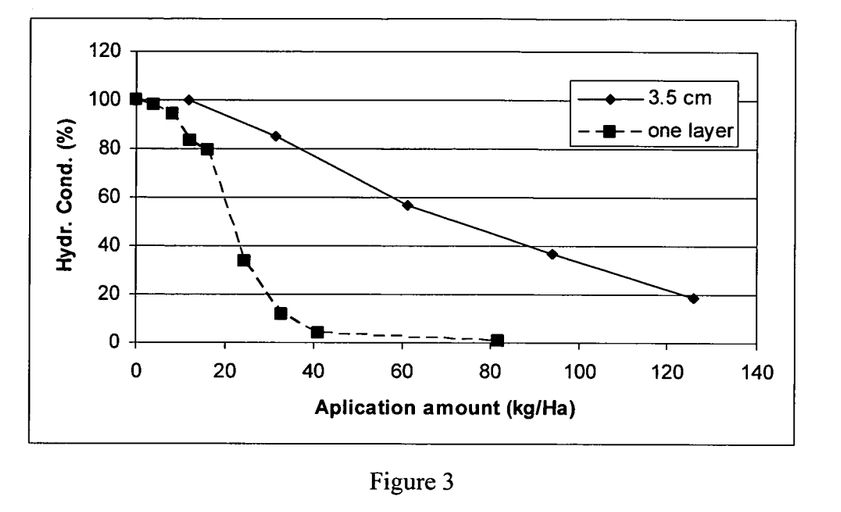
FIG. 3 is a graph showing the hydraulic conductivity of soil columns with varied amount of hydrogels distributed either in a single layer (dashed line) or in a layer with a thickness of 3.5 centimeters (solid line).

Referring to FIG. 3, the influence of the broadness of hydrogel particle distribution in soil to the clogging efficiency is observed.

Preparation a soil column with a single layer of hydrogel: Soil column was prepared with about 200 grams of sand as described above. A suspension of swollen hydrogel (varied amount) was added on the top of the soil column and allowed to drain until the solution reached the soil surface. A single layer of hydrogels was created by carefully adding small amount of sand (total sand used: 250 grams) onto the top of the soil column while adding small amount of water to prevent the trapping of air bubbles. (Swollen was large enough not to enter the soil pores.)

Preparation a soil column with homogeneous mixing of hydrogel and sand: Soil column was prepared with about 125 grams of sand as described above. A suspension of swollen hydrogel (varied amount) was mixed homogeneously with sand (total sand used: 250 grams), and loaded on the top of soil column to create that said soil column.

Varied amounts of hydrogel were applied either as a single layer (about less than 0.5 cm) or a homogeneous mixture with sand for a soil column test. The hydraulic conductivity of the resulted columns was measured and shown in FIG. 3. It was observed that reducing of the broadness of hydrogel vertical distribution in soil increases the clogging efficiency (where a higher concentration of hydraulic conductivity means more water capable of passing through the soil column).

It is apparent that embodiments other than those expressly described herein come within the spirit and scope of the present claims. Accordingly, the present invention is not defined by the above description, but is to be accorded the full scope of the claims so as to embrace any and all equivalent compositions and methods.

What is claimed is:

1. A soil additive comprising particles having a first polymer structure having a mean particle diameter ($D_{50}$) of from about 0.1 micrometers to about 200 micrometers, the first structure comprising permanent cross-links and non-permanent ionic cross-links, the particles having a property such that only upon contact with a monovalent stimulus selected from the group consisting of sodium ions, potassium ion, ammonium ions and any combination thereof present in soil, the non-permanent ionic cross-links become at least partially removed from the first structure via ion exchange with the monovalent stimulus, resulting in a second structure having a $D_{50}$ of from about 1 micrometer to about 5000 micrometers and a volume greater than the first structure, the ratio of volume of the first structure to the second structure being from about 1:3 to 1:500, wherein the ionic cross-links are derived from a cation selected from the group consisting of calcium, magnesium, zinc, copper, ferrous, barium, and any combination thereof.

2. The soil additive of claim 1 wherein the first structure has a substantially crystalline form and the second structure has a substantially non-crystalline form.

3. The soil additive of claim 1 wherein the polymer composition comprises a random, block, star-shape, grafted copolymer or any combination thereof.

4. The soil additive of claim 1 wherein the polymer composition is selected from the group consisting of polyacrylamide, poly(methacrylic acid), poly(acrylic acid), polyacrylate, poly(ethylene glycol), poly(vinyl alcohol), polyglycerol, polytetrahydrofuran, polyamide, a derivative of any of the foregoing and a copolymer of any of the foregoing.

5. The soil additive of claim 1 wherein the polymer composition comprises one or more carboxylic groups selected from the group consisting of acrylic acid, methacrylic acid, crotonic acid, sorbic acid, maleic acid, itaconic acid, cinnamic acid, a salt of any of the foregoing, an anhydride of any of the foregoing and a combination of any of the foregoing.

6. The soil additive of claim 1 wherein the polymer composition is formed from at least one monomer comprising acrylate, methacrylate, acrylamide, methacrylamide, vinyl alcohols, allyl alcohols, vinyl acetates, betaine-containing monomers, ethylenically unsaturated monomers, derivatives thereof or copolymers of any of the foregoing.

7. The soil additive of claim 1 wherein the polymer composition is selected from the group consisting of guar gum, hydroxypropyl guar gum, carboxymethyl guar gum, carboxymethylhydroxypropyl guar gum, starch, corn, wheat, rice, potato, tapioca, waxy maize, sorghum, waxy sarghum, sago and modified starches such as dextrinated, hydrolysed, oxidized, crosslinked, alkylated, hydroxyalkylated, acetylated, fractionated and physically modified starches, dextrin, chitin, chitosan, alginate compositions, xanthan gum, carageenan gum, gum karaya, gum Arabic, pectin and glass-like polysaccharides, cellulose, hydroxycellulose, hydroxyalkyl cellulose, hydroxyethyl cellulose, carboxymethylhydroxyethyl cellulose, hydroxypropyl cellulose and derivates of any of the foregoing.

8. The soil additive of claim 1 further comprising an inorganic material.

9. The soil additive of claim 8 wherein the inorganic material is selected from the group consisting of clay, diatom, silicate, silica, sand, calcium carbonate and any combination of the foregoing.

10. The soil additive of claim 1 wherein the polymer composition comprises a colloidal dispersion or aqueous suspension solution.

11. A method of increasing water retention in soil comprising applying a soil additive to soil, the soil additive comprising particles having a first polymer structure having a mean particle diameter ($D_{50}$) of from about 0.1 micrometers to about 200 micrometers, the first structure comprising permanent cross-links and non-permanent ionic cross-links, the particles having a property such that only upon contact with a monovalent stimulus selected from the group consisting of sodium ions, potassium ions, ammonium ions, and any combination thereof present in soil, the non-permanent ionic cross-links become at least partially removed from the first structure via ion exchange with the monovalent stimulus, resulting in a second structure having a $D_{50}$ of from about 1 micrometer to about 5000 micrometers and a volume greater than the first structure, the ratio of the volume of the first structure to the second structure being from about 1:3 to 1:500, wherein the ionic cross-links are derived from a cation selected from the group consisting of calcium, magnesium, zinc, copper, ferrous, barium, and any combination thereof.

12. The method of claim 11 wherein the polymer composition is selected from polyacrylamide, poly(methacrylic acid), poly(acrylic acid), polyacrylate, poly(ethylene glycol), poly(vinyl alcohol), polyglycerol, polytetrahydrofuran, polyamide, guar gum, hydroxypropyl guar gum, carboxymethyl guar gum, carboxymethylhydroxypropyl guar gum, starch, corn, wheat, rice, potato, tapioca, waxy maize, sorghum, waxy sarghum, sago and modified starches such as dextrinated, hydrolysed, oxidized, crosslinked, alkylated, hydroxyalkylated, acetylated, fractionated and physically modified starches, dextrin, chitin, chitosan, alginate compositions, xanthan gum, carageenan gum, gum karaya, gum Arabic, pectin and glass-like polysaccharides, cellulose, hydroxycellulose, hydroxyalkyl cellulose, hydroxyethyl cellulose, carboxymethylhydroxyethyl cellulose, hydroxypropyl cellulose, derivates of any of the foregoing or copolymers of any of the foregoing.

13. The method of claim 11 wherein the polymer composition comprises a colloidal dispersion or aqueous suspension solution that is capable of flowing into one or more water drainage channels present in the soil.

14. The method of claim 11 wherein the polymer composition comprises a colloidal dispersion or aqueous suspension solution that is capable of flowing from an area of high water potential to an area of relatively low water potential in the soil.

15. The method of claim 13 wherein the second structure is capable of effectuating a greater distribution of water in the soil relative to distribution of water in the soil prior to application of the soil additive.

16. The method of claim 15 wherein the second structure impedes or arrests the flow of water through the water drainage channels.

17. The method of claim 11 wherein the polymer composition in the second structure is maintained at a depth below the soil surface less than or equal to about 20 feet for a predetermined amount of clogging time.

18. The method according to claim 11 further comprising applying the soil additive to a target area of soil, whereby the soil additive is capable of forming a stable colloidal dispersion or suspension with water and penetrating the surface of the target area.

19. The method of claim 18 wherein the cross-linked polymer composition is selected from the group consisting of polyacrylamide, poly(methacrylic acid), poly(acrylic acid), polyacrylate, poly(ethylene glycol), poly(vinyl alcohol), polyglycerol, polytetrahydrofuran, polyamide, guar gum, hydroxypropyl guar gum, carboxymethyl guar gum, carboxymethylhydroxypropyl guar gum, starch, corn, wheat, rice, potato, tapioca, waxy maize, sorghum, waxy sarghum, sago and modified starches such as dextrinated, hydrolysed, oxidized, crosslinked, alkylated, hydroxyalkylated, acetylated, fractionated and physically modified starches, dextrin, chitin, chitosan, alginate compositions, xanthan gum, carageenan gum, gum karaya, gum Arabic, pectin and glass-like polysaccharides, cellulose, hydroxycellulose, hydroxyalkyl cellulose, hydroxyethyl cellulose, carboxymethylhydroxyethyl cellulose, hydroxypropyl cellulose, derivates of any of the foregoing or copolymers of any of the foregoing.

20. The method of claim 18 wherein the polymer composition comprises a colloidal dispersion or aqueous suspension solution that is capable of flowing from an area of high water potential to an area of relatively low water potential in the target area.

21. The method of claim 18 wherein the polymer composition comprises a colloidal dispersion or aqueous suspension solution that is capable of flowing into one or more water drainage channels present in soil in the target area.

22. The method of claim 21 wherein the second structure is capable of effectuating a greater distribution of water in the soil relative to distribution of water in the soil prior to application of the soil additive.

23. The method of claim 21 wherein the second structure impedes or arrests the flow of water through the water drainage channels.

24. The method of claim 18 wherein the polymer composition in the second structure is maintained at a depth below the target area surface less than or equal to about 20 feet for a predetermined amount of time.

25. The method of claim 18 wherein the polymer composition under the surface of the target area forms a substantially continuous distribution layer having a height of from about 0.1 to about 20 centimeters.

26. The method of claim 18 wherein the polymer composition under the surface of the target area forms a substantially continuous distribution layer having a height of from about 0.1 to about 3 centimeters.

27. The method of claim 18 wherein the polymer composition under the surface of the target area forms a substantially continuous layer having a height of less than about 0.5 centimeters.

28. The soil additive of claim 18 further comprising the step of optimizing the polymer composition to correspond to the mean pore size of soil in the target area.

* * * * *